(12) United States Patent
Ishihara (10) Patent No.: US 8,363,162 B2
(45) Date of Patent: Jan. 29, 2013

(54) VIDEO DISPLAY SYSTEM FOR A MOTOR VEHICLE

(75) Inventor: Dai Ishihara, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 940 days.

(21) Appl. No.: 12/110,604

(22) Filed: Apr. 28, 2008

(65) Prior Publication Data

US 2009/0268093 A1    Oct. 29, 2009

(51) Int. Cl.
*H04N 5/445* (2011.01)
(52) U.S. Cl. .............................. 348/564; 725/75; 725/77
(58) Field of Classification Search ................... 725/75; 348/564
See application file for complete search history.

(56) References Cited

U.S. PATENT DOCUMENTS

| | | | |
|---|---|---|---|
| 4,399,462 A | 8/1983 | Balopole et al. | |
| 5,729,300 A | 3/1998 | Ahn | |
| 6,346,927 B1 | 2/2002 | Tran et al. | |
| 6,441,861 B2 | 8/2002 | Vaughan et al. | |
| 6,806,911 B2 | 10/2004 | Takemoto | |
| 7,034,776 B1 | 4/2006 | Love | |
| 7,221,362 B2 | 5/2007 | Sekiguchi et al. | |
| 2001/0006382 A1* | 7/2001 | Sevat | 345/169 |
| 2001/0048482 A1* | 12/2001 | Takemoto | 348/564 |
| 2004/0028142 A1 | 2/2004 | Kim | |
| 2004/0189881 A1* | 9/2004 | Cook et al. | 348/837 |
| 2006/0221254 A1 | 10/2006 | Chang | |
| 2007/0035470 A1 | 2/2007 | Lee et al. | |
| 2007/0120763 A1* | 5/2007 | De Paepe et al. | 345/1.3 |

* cited by examiner

*Primary Examiner* — Scott Beliveau
*Assistant Examiner* — Kunal Langhnoja
(74) *Attorney, Agent, or Firm* — Plumsea Law Group, LLC (57) ABSTRACT

A video display system for a motor vehicle is disclosed. The video display system includes a display screen configured for single display mode and dual display mode. The display screen further includes a left image portion and a right image portion associated with a left external input port and a right external input port, respectively.

23 Claims, 10 Drawing Sheets

VIDEO DISPLAY SYSTEM FOR A MOTOR VEHICLE

BACKGROUND OF THE INVENTION

1. Field of the Invention

The present invention relates to motor vehicles and in particular to a video display system for a motor vehicle.

2. Description of Related Art

Dual display systems configured to simultaneously display images from multiple sources have been previously proposed. Takemoto (U.S. Pat. No. 6,806,911) teaches a display system with single and dual image modes. In particular, Takemoto teaches a display screen that switches automatically from a single image mode to a dual image mode by detecting the presence of a signal from one or more sources.

Takemoto teaches a display system, including a display device connected to a first signal source and a second signal source. When a signal is sent from both sources, the display device is configured to display in dual image mode. In this case, two images are simultaneously displayed on the screen of the device according to the first and second video inputs. Furthermore, if the signal from the second source is stopped, a dual/single image mode switch section of the display system outputs a video signal for single image mode. In this case, a single image is displayed, corresponding to the signal from the first source. This switching is done automatically without the use of any switching signal.

Balopole (U.S. Pat. No. 4,399,462) teaches a video split screen technique. Balopole teaches a system that can be used to display radar images and cockpit camera images simultaneously for the purpose of training pilots. Balopole teaches connecting the system to a radar unit and to a cockpit camera. The combined signal displayed on the television screen will be the cockpit camera output for the first half of the raster line whereas the second half of the line will display the output from the radar unit. Thus, the images from the radar and the camera will be juxtaposed simultaneously on the television monitor.

De Paepe et al. (U.S. patent application publication number 2007/0120763) teaches a display system for viewing multiple video signals. De Paepe teaches this system to overcome the problems associated with using multiple physically distinct display screens in situations where multiple displays must be used.

De Paepe teaches a system including a display, which further includes a display panel. The display is further connected to two workstations, each comprising a graphical board and a frame buffer. The display is divided into two areas: a first area receiving images from the frame buffer associated with a first workstation, and a second area receiving images from the frame buffer associated with a second workstation.

Lee et al. (U.S. patent application publication number 2007/0035470) teaches an apparatus for providing multiple screens and a method of dynamically configuring multiple screens within a single physical display device. Lee teaches a system that receives multiple signals from multiple sources and displays the multiple signals on a single screen. In one embodiment, signals from a terrestrial broadcaster, a cable broadcaster and a personal video recorder are fed into a broadcast receiver. These multiple signals are then shown on a single physical display device.

The prior art lacks provisions for easily choosing which input device will be displayed on a particular side or region of a display configured for dual display mode. For example, in a motor vehicle a single display screen may be configured to display two images, associated with the left and right side of the display screen. If the display screen is configured to display a movie on one side and a video game on the other side, it is preferable that the movie is displayed on the side of the display screen closest to the rear passenger wishing to watch the movie. Likewise, it is preferably that the video game is displayed on the side of the display screen closest to the rear passenger wishing to play the video game. There is a need for a video display system that solves the problems of the prior art.

SUMMARY OF THE INVENTION

A video system to be used in a motor vehicle with a video system indicator is disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

In one aspect, the invention provides a video display system for a motor vehicle comprising: a display screen configured to receive video information from one or more video devices, the display screen being configured to alternate between a single display mode and a dual display mode, the dual display mode having a left image portion and a right image portion; a left external input port in communication with the display screen and a right external input port in communication with the display screen; the left external input port being physically located to the left of the right external input port; and where the left external input port is associated with the left image portion and where the right external input port is associated with the right image portion.

In another aspect, a first video signal received at the left external input port is displayed in the left image portion.

In another aspect, a second video signal received at the right external input port is displayed in the right image portion.

In another aspect, the left external input port and the right external input port share a set of common audio input ports.

In another aspect, the left external input port and the right external input port are disposed on a rear console.

In another aspect, the left external input port and the right external input port are configured to connect to an external video device.

In another aspect, the invention provides a method of operating a display screen, comprising the steps of: receiving a first video signal from a first video device, wherein the first video device is a primary video device; receiving a second video signal associated with an external video device; displaying the first video signal on a left image portion of the display screen and displaying the second video signal on a right image portion of the display screen when the second video signal is received from a right external input port; and displaying the second video signal on the left portion of the display screen and displaying the first video signal on the right image portion of the display screen when the second video signal is received from a left external input port.

In another aspect, the primary video device is a DVD player.

In another aspect, the primary video device is a navigation system.

In another aspect, the external video device is a DVD player.

In another aspect, the external video device is a video game system.

In another aspect, the first video signal is displayed in single display mode when the external video device is disconnected from the display screen.

In another aspect, the invention provides a method of operating a display screen, comprising the steps of: receiving a first video signal from a first video device, wherein the first video device is a primary video device; receiving a second video signal from a left external input port that is connected to a second video device, wherein the second video device is an external video device; associating the first video signal with a right image portion of the display screen and associating the second video signal with a left image portion of the display screen; and operating the display screen in a single display mode and displaying only the first video signal when the second video device is disconnected from the left external input port.

In another aspect, the second video signal is displayed on the display screen in single display mode when the first video device is turned off.

In another aspect, a first external video device is connected to the left external input port and a second external video device is connected to the right external input port.

In another aspect, the first external video device is associated with a third video signal and the second external video device is associated with a fourth video signal.

In another aspect, the third video signal is displayed in the left image portion of the display screen.

In another aspect, the fourth video signal is displayed in the right image portion of the display screen.

In another aspect, the left external input port is disposed to the left of a right external input port.

In another aspect, the left image portion is disposed to the left of the right image portion.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
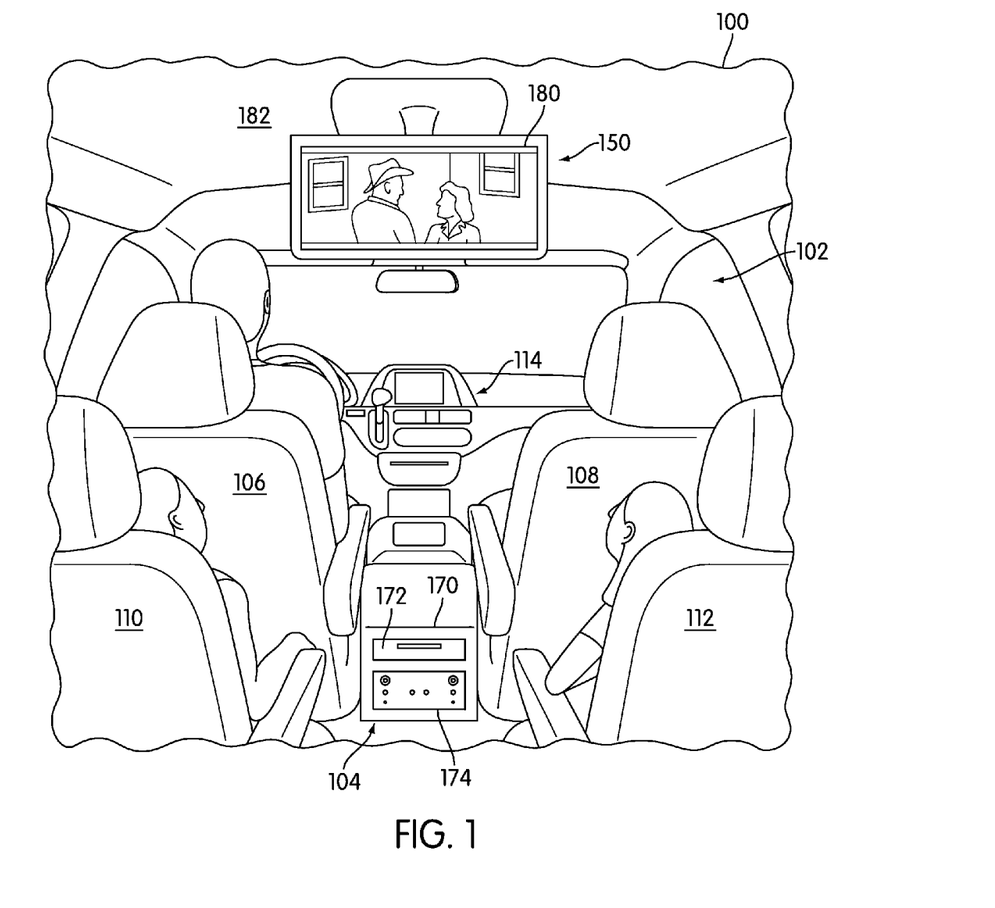
FIG. 1 is a preferred embodiment of a motor vehicle interior.

FIG. 1 is a preferred embodiment of motor vehicle interior 100. In this embodiment, motor vehicle interior 100 may be the interior of a mini-van. In other embodiments, motor vehicle interior 100 could be associated with any car, truck or similar motor vehicle.

Preferably, motor vehicle interior 100 may comprise front compartment 102 and rear compartment 104. Front compartment 102 may include driver seat 106 and front passenger seat 108. Likewise, rear compartment 104 may comprise first rear seat 110 and second rear seat 112. Although only two rear seats are shown in this embodiment, in other embodiments, motor vehicle interior 100 may include multiple rear seats.

Motor vehicle interior 100 may include front console 114. Front console 114 preferably includes various provisions for operating a motor vehicle as well as provisions for controlling various systems associated with motor vehicle interior 100. These systems include, but are not limited to heating/cooling systems, audio and/or video systems, navigational systems, as well as other systems. Front console 114 may also be associated with various meters (such as speedometers and odometers) as well as other switches or indicia configured for relaying information to a driver (such as turn signal switches and indicators).

Motor vehicle interior 100 may also include rear console 170. Rear console 170 preferably includes provisions that allow rear passengers to operate one or more systems associated with motor vehicle interior 100. In particular, rear console 170 may be associated with controls for one or more systems discussed with respect to front console 114, as well as other systems or controls.

Preferably, motor vehicle interior 100 includes provisions for entertaining one or more passengers. In some embodiments, motor vehicle interior 100 may include video display system 150. The term "video display system" as used throughout this detailed description and in the claims refers to any system that includes provisions for displaying one or more video images associated with one or more video devices. Although this detailed description includes embodiments of video display systems associated with motor vehicles, it should be understood that in other embodiments a video display system may be used without a motor vehicle. Examples of various video devices include, but are not limited to, digital video disc (DVD) players, video cassette recorders (VCRs), navigational systems, game consoles, television tuners, cable boxes, digital video recorders (DVRs), video cameras, digital cameras, computers, karaoke machines as well as any other type of electrical device that can produce video output that may be displayed on a screen of some kind.

A display screen may be configured to display one or more video images. The term "video image" as used throughout this detailed description and in the claims, refers to any kind of video information or data, including pictures, videos, or other types of video information. The term video image is not intended to be limited to still frame images, as it is understood that all video information is a collection of still frame images displayed in sequence. Furthermore, the term "video signal"

may also be used throughout this detailed description and in the claims to describe various different types of video information.

Preferably, a video display system includes one or more display screens. Generally, a display screen may be disposed anywhere in a motor vehicle. For example, in some cases, a display screen could be disposed on a front console. In other cases, laws may require a display screen intended for viewing movies or videos to be located rearwards of a driver to prevent potential distractions. In some embodiments, display screens could be located on the rear side of one or both front seats. In a preferred embodiment, one or more display screens could be configured to hang from a roof of the motor vehicle.

In this preferred embodiment, video display system 150 includes display screen 180 that is disposed on roof 182 of motor vehicle interior 100. Generally, display screen 180 could be any type of display, including, but not limited to flat panel display screens, liquid crystal display (LCD) screens, plasma screens, cathode ray tube (CRT) televisions, light emitting diode (LED) screens, projection screens and any other type of display screen. In this preferred embodiment, display screen 180 may be a flat panel display screen. Additionally, display screen 180 could have any dimensions. In some cases, display screen 180 may be configured for various standard aspect ratios, including 4:3 and 16:9 aspect ratios. In other embodiments, display screen 180 may be configured for a different aspect ratio. In a preferred embodiment, display screen 180 is a widescreen display.

Preferably, a video display system also includes one or more video devices, including any of the video devices previously discussed. In this embodiment, video display system 150 may include first video device 172. In some embodiments, first video device 172 may be a primary video device. The term "primary video device" as used throughout this detailed description and in the claims refers to any video device that is usually connected to a video display system. In some embodiments, the primary video device may be permanently wired to one or more additional electrical components, including audio speakers, video displays or other electrical components. Generally, a primary video device may be installed by a manufacturer. In other cases, however, a vehicle owner could install one or more primary video devices. Preferably, the primary video device is connected to additional electrical components in a manner that prevents the electrical connections from being visible to a driver or passenger. In a preferred embodiment, first video device 172 may be a DVD player. In other embodiments, however, first video device 172 could be any other type of video device.

In this embodiment, first video device 172 is disposed within rear console 170. In other embodiments, however, first video device 172 could be located elsewhere within motor vehicle interior 100. For example, in some embodiments, first video device 172 could be disposed within front console 114. In other embodiments, first video device 172 could be a roof mounted video device. In still other embodiments, first video device 172 could be disposed in a trunk of a motor vehicle.

Preferably, video display system 150 includes provisions for displaying video images from one or more external video devices. The term "external video device" as used throughout this detailed description and in the claims refers to any video device that may be readily connected and disconnected from video display system 150. Generally, an external video device is portable and can be easily transported. In other words, the external video device may be removed from motor vehicle interior 100. Examples of external video devices include any type of video device that is not configured to permanently attach to a portion of motor vehicle interior 100. In a preferred embodiment, an external video device may be some kind of portable video device, such as a portable DVD player, a portable video game system, a laptop or another type of portable video device.

In the current embodiment, rear console 170 also includes input panel 174. Preferably, input panel 174 includes provisions for connecting one or more external video devices to video display system 150. By connecting an external video device to input panel 174, the images from the external video device may be displayed on display screen 180.

Figure 2:
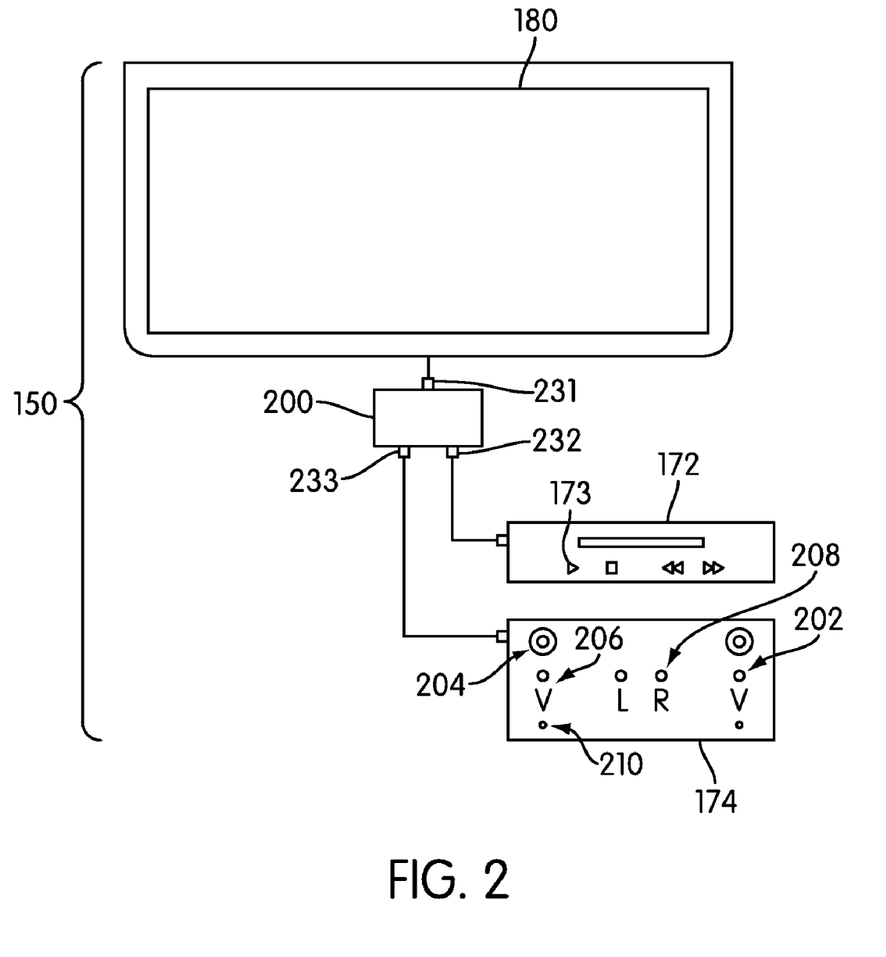
FIG. 2 is a schematic view of a preferred embodiment of a video display system.

FIG. 2 is a schematic view of a preferred embodiment of video display system 150. In some embodiments, video display system 150 may include control unit 200. Control unit 200 may be any type of electrical component for processing video information. In some cases, control unit 200 could be a microprocessor, a central processing unit (CPU), or another type of processor. In other cases, control unit 200 could comprise a simple electrical detection circuit in conjunction with a microprocessor.

Although control unit 200 is physically separated from display screen 180 in this embodiment, in other embodiments, control unit 200 may be an internal component of display screen 180. In still other embodiments, control unit 200 may be associated with an on board computer of a motor vehicle that is configured to route information from video devices to display screen 180.

Control unit 200 may include a number of ports that facilitate the input and output of information and power. The term "port" means any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with control unit 200 are optional. Some embodiments may include a given port or provision, while others may exclude it. The following description discloses many of the possible ports and provisions that can be used, however, it should be kept in mind that not every port or provision must be used or included in a given embodiment.

Control unit 200 may include provisions for communicating with display screen 180. In this embodiment, control unit 200 includes first port 231 that is configured to transmit video images and video information to display screen 180. In some cases, control unit 200 could also receive video information from display screen 180 through first port 231.

Control unit 200 may also be configured to receive video images and video information from one or more video devices. In this embodiment, control unit 200 may include second port 232 that is designed to communicate with first video device 172. For purposes of illustration, first video device 172 is shown as a DVD player, including several video controls 173. In other embodiments, however, first video device 172 could have any size and/or shape, and could be configured with any arrangement of video controls 173.

Control unit 200 may also be in communication with input panel 174 via third port 233. In some embodiments, input panel 174 may comprise additional ports for receiving video information from one or more external video devices. In this embodiment, input panel 174 may preferably include external input ports 202. The term "external input port" refers to any port that is configured to be connected to an external video device. Generally, external input ports 202 may comprise various different types of input ports and/or input jacks that provide for the transfer of video images and video information. Examples include coaxial inputs, composite video inputs, S-video inputs, HDMI inputs, component video inputs, USB inputs as well as other types of inputs. Additionally, external input ports 202 may comprise one or more types of audio input ports.

For purposes of illustration, external input ports 202 are shown here to include coaxial ports 204 and composite video ports 206. Additionally, input panel 174 may include component audio ports 208 and headphone audio ports 210 for receiving additional audio information from one or more video devices. It should be understood that external input ports 202 could comprise additional external input ports as well.

Often, two rear passengers traveling in a motor vehicle may want to watch different movies. Likewise, one passenger may wish to watch a movie, while the other may wish to play a video game. In some embodiments, a video display system may include provisions for displaying two video images simultaneously.

In the current embodiment, video display system 150 may be configured to alternate between a single display mode and a dual display mode. The term "single display mode" as used throughout this detailed description and in the claims refers to the display of video images from a single video device, including both external video devices and primary video devices. Also, the term "dual display mode" as used throughout this detailed description and in the claims refers to the display of two distinct video images from two distinct video devices.

Figure 3:
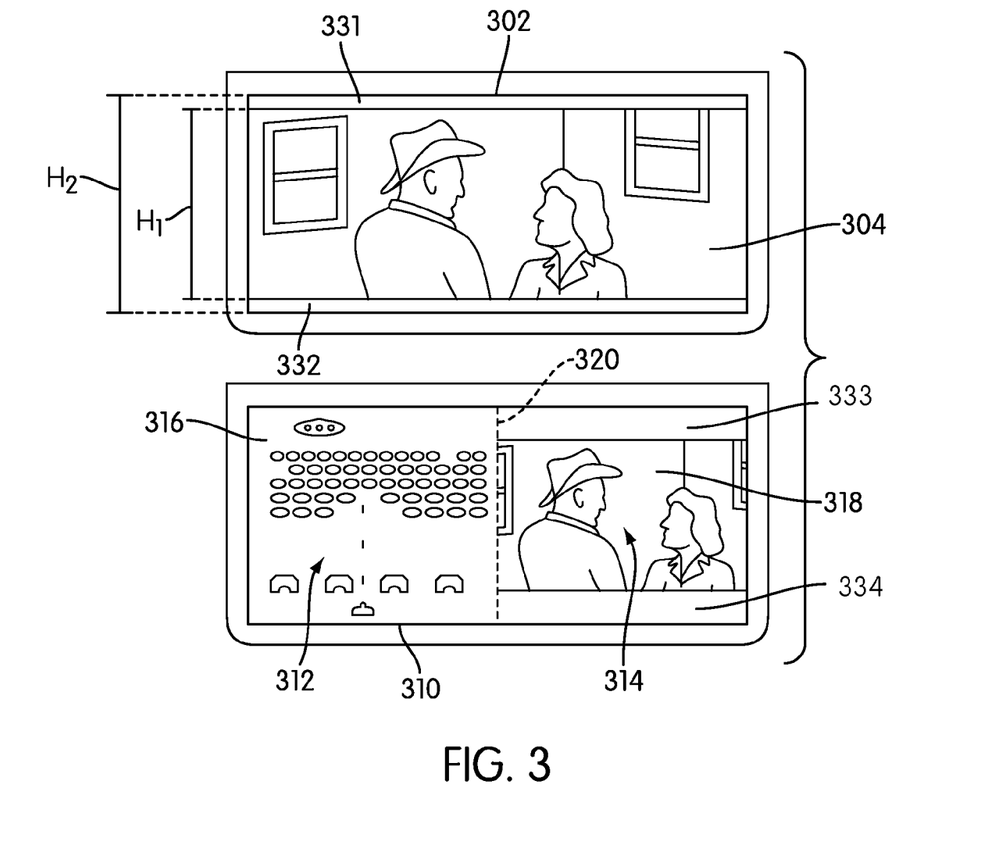
FIG. 3 is a schematic view of a preferred embodiment of two display modes associated with a video display system.

FIG. 3 is a schematic view of a preferred embodiment of two display modes associated with a video display system. In this embodiment, first display screen 302 is operating in a single display mode. In this case, single video image 304 is displayed over the entirety of first display screen 302. Although single video image 304 appears to be a scene from a movie, it should be understood that single video image 304 could be any video image, including any video image from any type of video device.

Preferably, second display screen 310 is operating in a dual display mode in the current embodiment. In this case, second display screen 310 comprises two distinct portions, including left image portion 312 and right image portion 314 that are associated with image boundary 320. Left image portion 312 and right image portion 314 are preferably associated with first video image 316 and second video image 318, respectively. For purposes of illustration, first video image 316 is a video image from a video game and second video image 318 is a video image from a movie, however in other embodiments, video images 316 and 318 could be any type of video images.

Generally, the dual display mode may be used with any display screen, including any aspect ratio. In this current embodiment, first and second display screens 302 and 310 have a standard widescreen aspect ratio of 16:9. Furthermore, the aspect ratio of each image portion 312 and 314 is approximately 8:9. However, in other embodiments, the aspect ratio of a display screen could be any known aspect ratio. Furthermore, left image portion 312 and right image portion 314 could have any aspect ratios that combine to fit within the aspect ratio of second display screen 310. For example, in some cases, left image portion 312 could occupy about 25 percent of second display screen 310 while right image portion 314 could occupy about 75 percent of second display screen 310.

In some cases, the single display mode may be associated with a full screen mode. However, it should be understood that the single display mode could be configured to display a single video image in any aspect ratio, including aspect ratios that are different than the aspect ratio of the display screen. For example, in this embodiment, single video image 304 may be associated with a slightly different aspect ratio than the aspect ratio of first display screen 302. In some cases, letterboxing may occur to preserve the original aspect ratio of single video image 304. In this case, single video image 304 may have a height H1 that is slightly less than the height H2 of first display screen 302, which may result in the appearance of first matte 331 and second matte 332. Therefore, in some cases, single display mode may leave some areas of the screen unused.

Additionally, during dual display mode, some of the area associated with one or more image portions may be unused. In the current embodiment, second video image 318 is displayed with third matte 333 and fourth matte 334, to preserve the original aspect ratio of second video image 318. Furthermore, in this case, second video image 318 has been partially cropped to better fit the aspect ratio of right image portion 314.

Preferably, a video display system includes provisions for associating a video image from an external video device with a particular side of a display screen during dual display mode. This feature may be particularly important when traveling in a motor vehicle so that a rear passenger seated to the left can watch a movie or play a game that is viewed on the left side of the display screen, while a rear passenger seated to the right can watch a movie or play a game that is viewed on the right side of the display screen.

Figure 4:
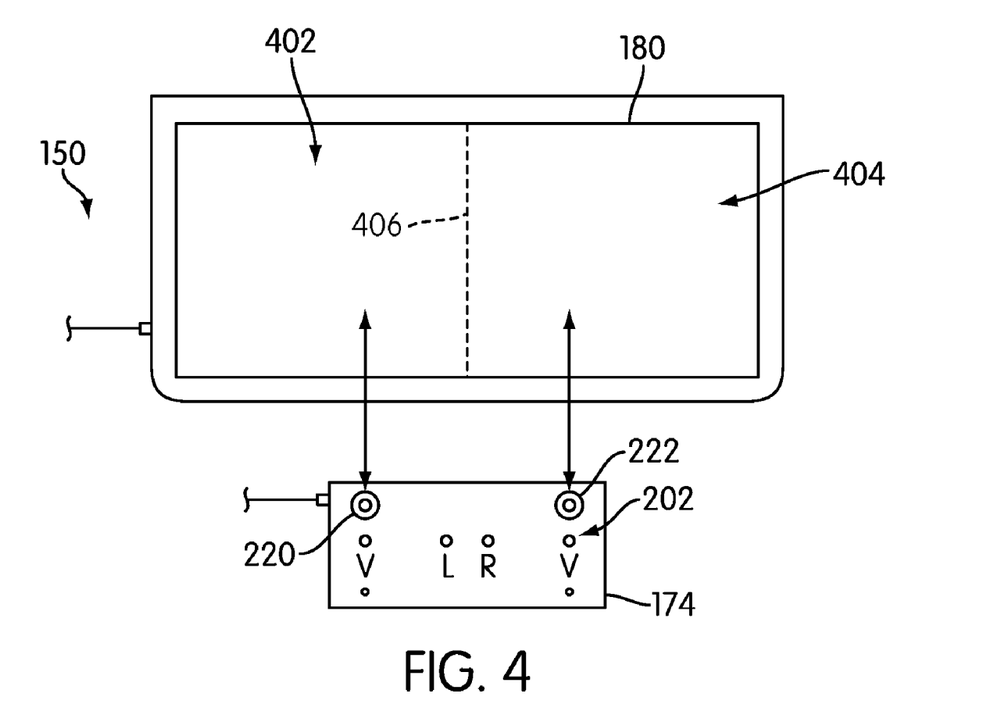
FIG. 4 is a schematic view of a preferred embodiment of a portion of a video display system.

Referring to FIG. 4, external input ports 202 preferably comprise complementary left and right external input ports. For example, input panel 174 includes left external input port 220 and right external input port 222. In particular, left external input port 220 is disposed to the left of right external input port 222. In this embodiment, external input ports 220 and 222 are coaxial input ports, however, in other embodiments, external input ports 220 and 222 could be video composite input ports or any other type of input port previously discussed.

In this embodiment, display screen 180 may be further associated with left image portion 402 and right image portion 404 during dual display mode. Image portions 402 and 404 are separated at image boundary 406. In this case, image boundary 406 is configured to divide display screen 180 in half. In other cases, image boundary 406 could be moved.

Throughout the following detailed description it should be understood that dual display mode may be automatically activated whenever two video signals are received at a control unit and/or display screen. In some cases, a display screen could include a manual switch to alternate between single display mode and dual display mode. In a preferred embodiment, a display screen may be configured to automatically detect the presence of two video signals and automatically switch to dual display mode in order to display two video images simultaneously. Furthermore, if at any time during dual display mode one of the two video signals is stopped, a control unit may automatically switch to single display mode to display the remaining single video image.

Preferably, left external input port 220 is directly associated with left image portion 402 of display screen 180 and right external input port 222 is directly associated with right image portion 404 of display screen 180. In particular, by connecting an external video device to left external input port 220 during dual display mode, the corresponding video signal is transferred to display screen 180 and the video image is displayed on left image portion 402. Furthermore, by connecting an external video device to right external input port 222 during dual display mode, the corresponding video signal is transferred to display screen 180 and the video image is displayed on right image portion 404.

FIGS. 5-8 are intended to illustrate preferred embodiments of various configurations of video display system 150. The following embodiments are only meant to be illustrative. It should be understood that various other configurations of video display system 150 could be achieved using the principles taught in this detailed description. In other embodiments, external input ports may be disposed in locations other than a rear console including, but not limited to, arms rests, seats, as well as other portions of the motor vehicle interior. For example, in one embodiment, a left input port could be located on a left armrest of a left rear door and a right input port could be located on a right armrest of a right rear door. In another embodiment, a left input port could be disposed within a rear side of a left front passenger seat and a right input port could be disposed within a rear side of a right front passenger seat.

Referring back to FIG. 1, display screen 180 is visible to both rear passengers. In this case, display screen 180 is configured in single display mode. In particular, a single movie can be viewed on display screen 180 that can be viewed by both passengers. In this preferred embodiment, display screen 180 is initially configured to show a video signal from first video device 172.

Figure 5:
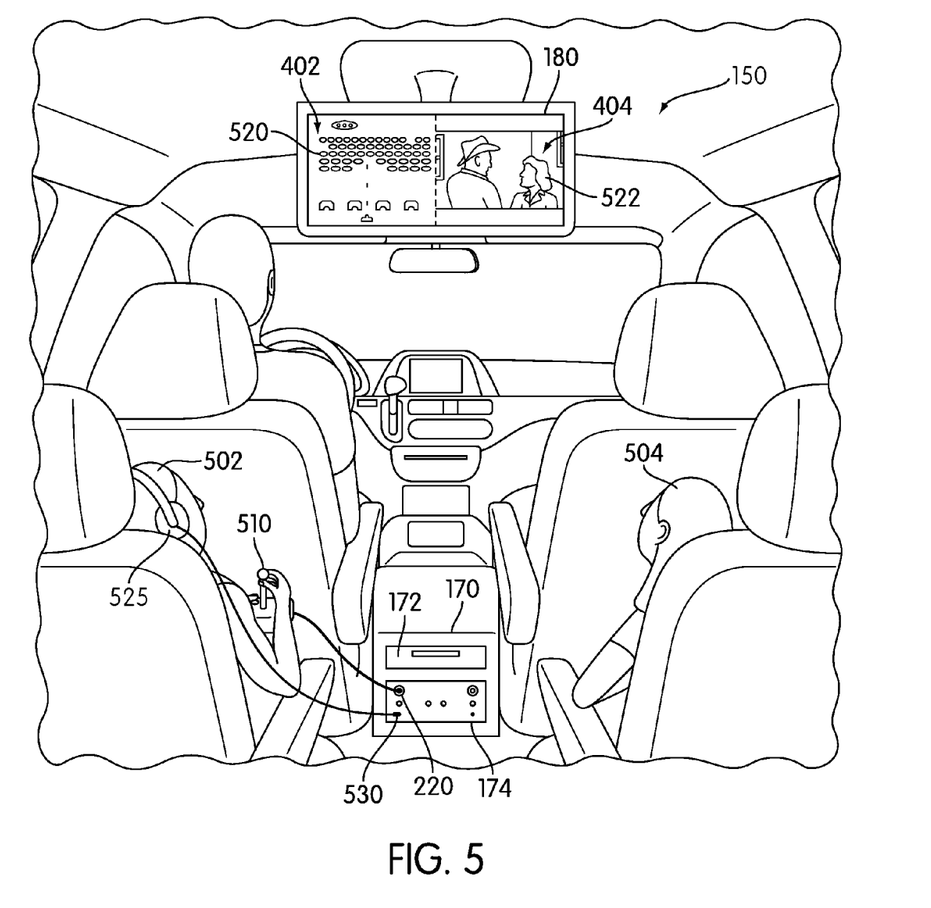
FIG. 5 is a preferred embodiment of a configuration of a video display system.

Referring to FIG. 5, video display system 150 includes provisions for automatically switching to a dual display mode when an external video device has been connected at input panel 174 in rear console 170. In this embodiment, left rear passenger 502 may prefer to play a video game, rather than watch a movie. However, right rear passenger 504 may want to keep watching the movie. In this embodiment, left rear passenger 502 may connect first external video device 510 to left external input port 220 of input panel 174. In this case, first external video device 510 may be a video game system of some kind.

Preferably, as first external video device 510 is connected to left external input port 220, display screen 180 may automatically switch to dual display mode. At this point, display screen 180 may be configured to display first video image 520 on left image portion 402. Preferably, first video image 520 corresponds to video signals sent from first external video device 510. Additionally, display screen 180 may be configured to simultaneously display second video image 522 on right image portion 404. Preferably, second video image 522 corresponds to video signals sent from first video device 172.

In some embodiments, left rear passenger 502 may also wear headphones 525 that are connected to input panel 174 at left headphone audio port 530. In some cases, the audio associated with second video image 522 is played through speakers of the motor vehicle. This arrangement may keep the audio from each video device from interfering with one another. In other embodiments, right rear passenger 504 could also wear headphones that are connected to first video device 172 directly.

Figure 6:
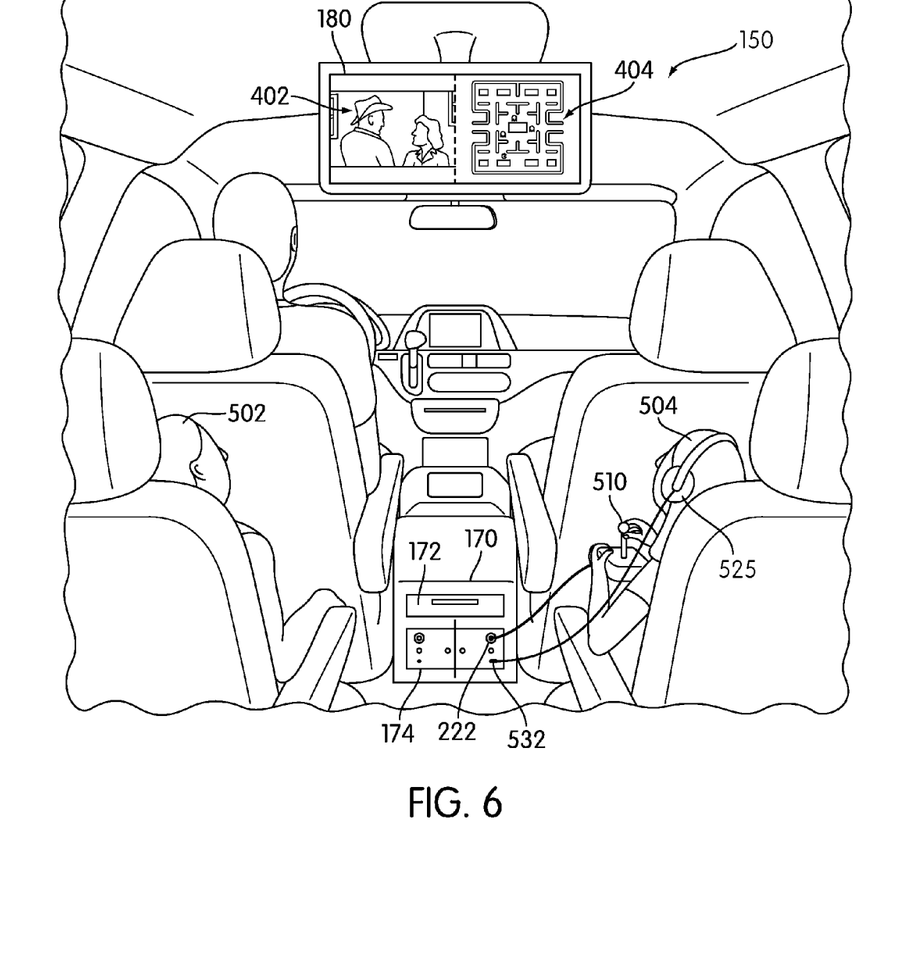
FIG. 6 is a preferred embodiment of a configuration of a video display system.

Referring to FIG. 6, in some cases, right rear passenger 504 may wish to play a video game while left rear passenger 502 watches a movie. In this case, right rear passenger 504 may connect first external video device 510 to input panel 174 on rear console 170. Preferably, first external video device 510 may be connected at right external input port 222 so that the video signal from first external video device 510 may be displayed on right image portion 404 of display screen 180.

With this arrangement, left image portion 402 may display video signals from first video device 172. Also, right image portion 404 may display video signals from first external video device 510. As with the previous embodiment, right rear passenger 504 may also attach headphones 525 to right headphone audio port 532 to prevent audio from video devices 172 and 510 from interfering with one another.

Preferably, a video display system includes provisions for displaying video signals from an external video device during a single display mode. In some cases, the external video device could be connected to a left external input port. In other cases, the external video device could be connected to a right external input port.

Figure 7:
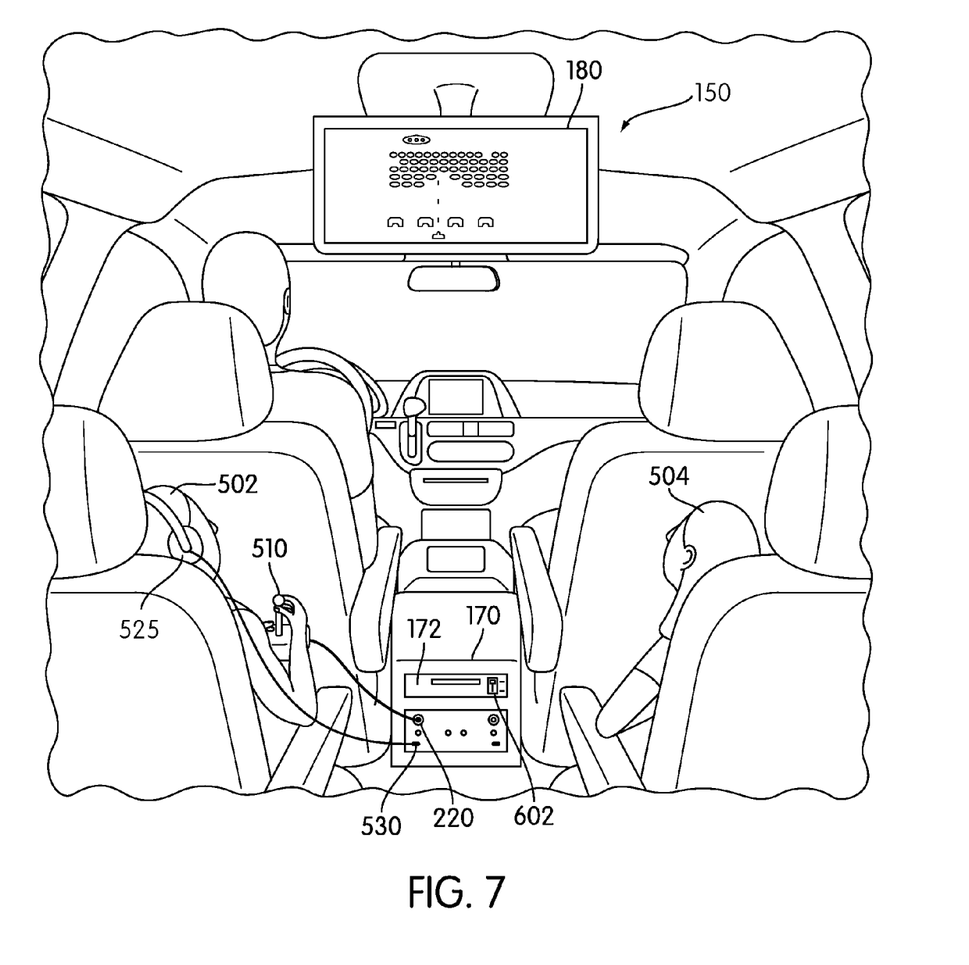
FIG. 7 is a preferred embodiment of a configuration of a video display system.

Referring to FIG. 7, display screen 180 may be configured to display video signals from first external video device 510 during single display mode. In this embodiment, first video device 172 may be turned off using power switch 602. Furthermore, first external video device 510 may be connected to left external input port 220. With this arrangement, only a single video signal may be received at control unit 200 (see FIG. 2). Therefore, control unit 200 selects single display mode for display screen 180 so that video signals from first external video device 510 may be viewed across the substantial entirety of display screen 180.

Figure 8:
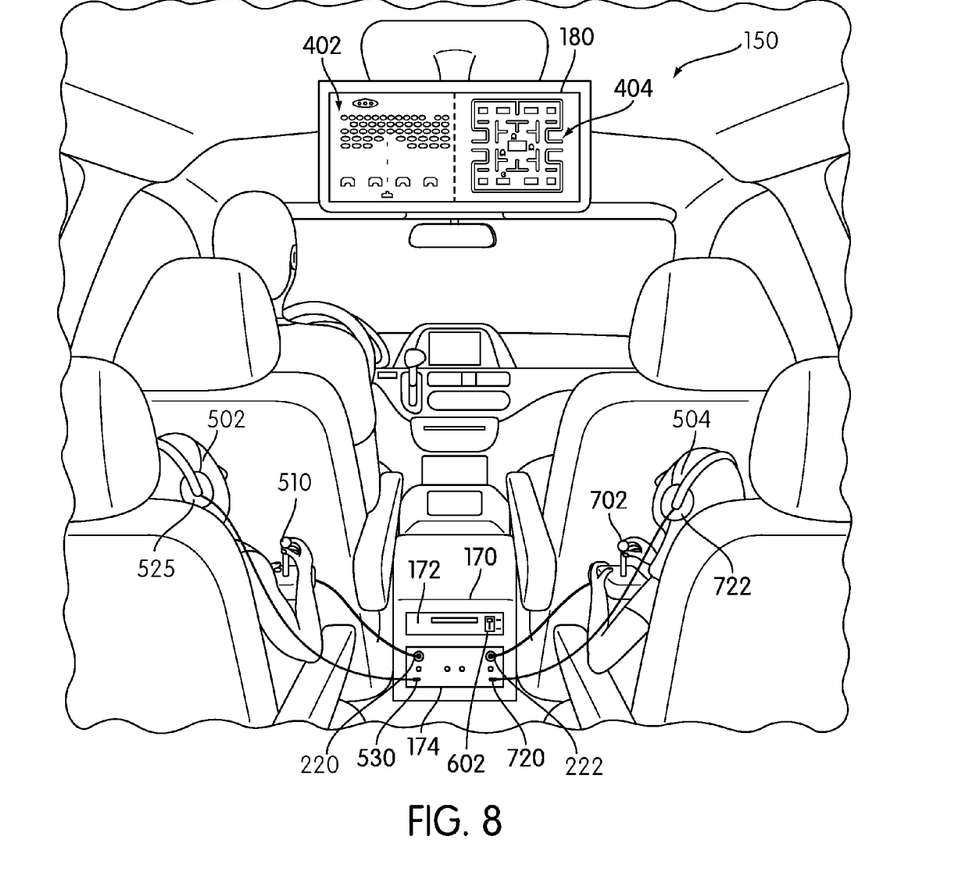
FIG. 8 is a preferred embodiment of a configuration of a video display system.

Referring to FIG. 8, in some embodiments, video display system 150 may include provisions for displaying video signals from two separate external video devices during dual display mode. In this embodiment, first video device 172 is turned off as indicated by power switch 602. Furthermore, two external video devices may be connected to input panel 174 on rear console 170. In particular, first external video device 510 may be connected at left external input port 220. Likewise, second external video device 702 may be connected at right external input port 222. In some cases, passengers 502 and 504 may also use headphones 525 and 722, respectively. In this case, headphones 525 are connected at left headphone audio port 530, while headphones 722 are connected at right headphone audio port 720.

With this arrangement, display screen 180 may be configured to display a first video signal from first external video device 510 on left image portion 402. Likewise, display screen 180 may be configured to display a second video signal from second external video device 702 on right image portion 404. This arrangement allows both rear seat passengers 502 and 504 to view video signals from external video devices 510 and 702, simultaneously on display screen 180.

The video display system discussed in this detailed description provides a simple method for operating a display screen in dual display mode. In particular, using the methods discussed here a left rear seat passenger can easily watch video images from an external video device by attaching the device to a left external input port. Additionally, a right rear seat passenger can easily watch video images from an external video device by attaching the device to a right external input port. Using this method, there is no need to use switches or other complicated provisions to swap video images on a dual display screen.

Figure 9:
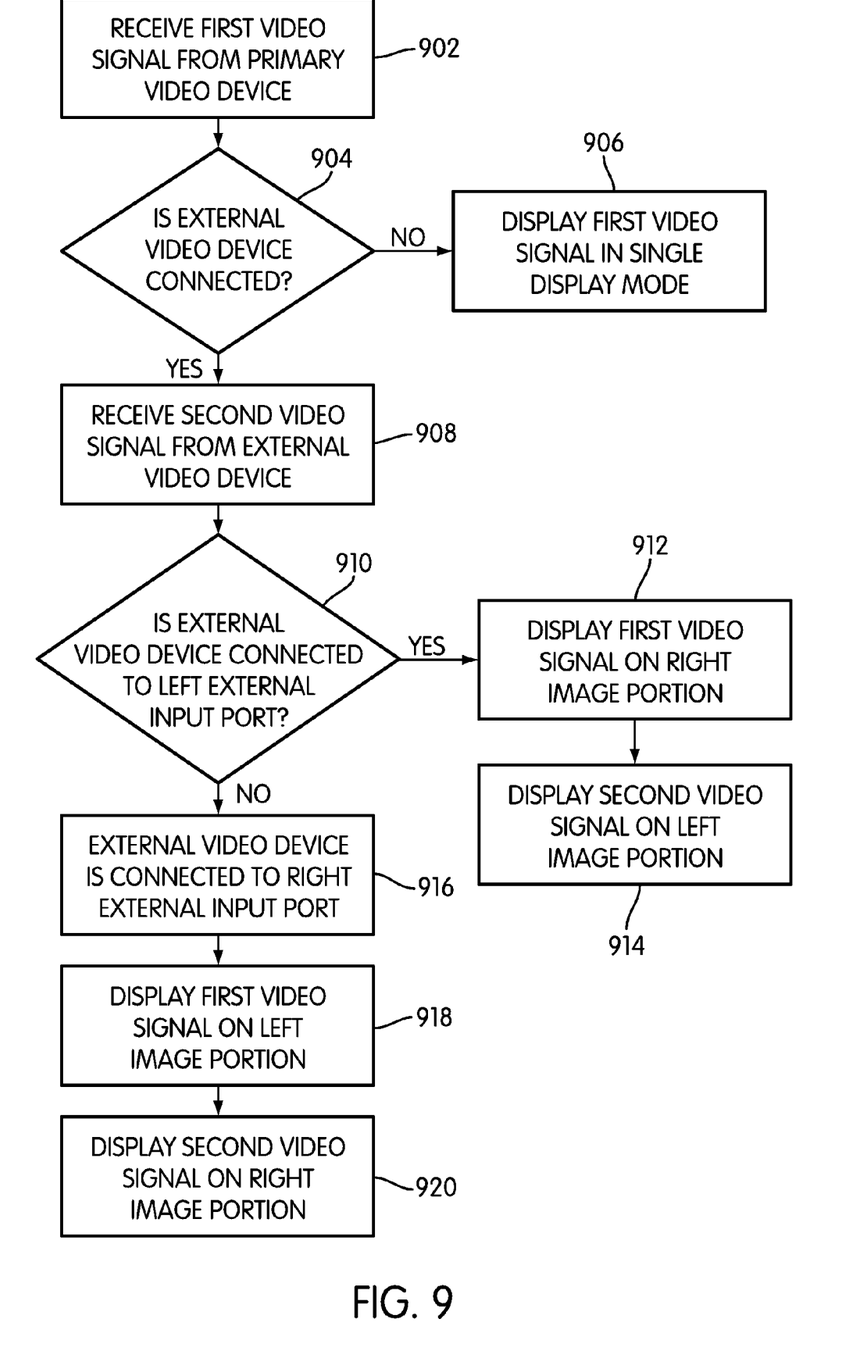
FIG. 9 is a preferred embodiment of a process for controlling a video display system.
Figure 10:
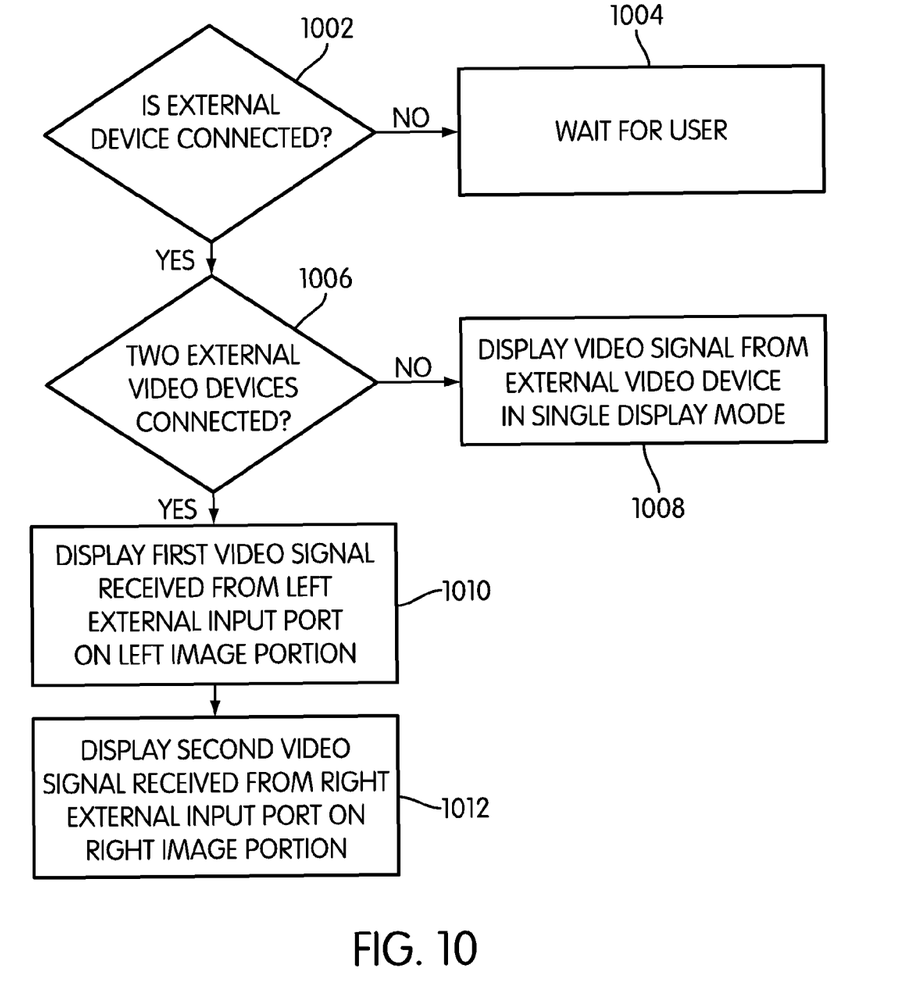
FIG. 10 is a preferred embodiment of a process for controlling a video display system.

FIGS. 9 and 10 are preferred embodiments of two processes for controlling a video display system. The steps in each process are preferably performed by a control unit. However, in other embodiments, some steps may be performed by other devices or control systems. In some cases, some of the steps may be optional.

FIG. 9 is a preferred embodiment of a process for controlling a video display system while a primary video device is powered on or activated. During first step 902, a control unit may receive a first video signal from a primary video device. Following this step, the control unit may proceed to second step 904. During second step 904, the control unit may determine if an external video device is connected via an input panel. If no external video device is connected, the control unit may proceed to third step 906. During third step 906, the control unit may operate the display screen in a single display mode. At this point, the control unit may display the first video signal from the primary video device on a display screen.

If, during second step 904, the control unit determines that an external video device is connected and transmitting video signals, the control unit may proceed to fourth step 908. During fourth step 908, the control unit preferably receives a second video signal from an external video device. At this point, the control unit preferably proceeds to fifth step 910. Preferably, at this point, the control unit controls the display screen in a dual display mode.

During fifth step 910, the control unit may determine which external input port is receiving a signal from the external video device. If the external video device is connected to the left external input port, the control unit may proceed to sixth step 912. During sixth step 912, the control unit may display the first video signal from the primary video device on the right image portion of the display screen. Following this, during a seventh step 914, the control unit may display the second video signal from the external video device on the left image portion of the display screen.

If, during fifth step 910, the control unit determines that the external video device is not connected to the left external input port, the control unit proceeds to eighth step 916. During eighth step 916, the control unit determines that the external video device is connected to the right external input port. Following this, the control unit proceeds to ninth step 918. During ninth step 918, the control unit displays the first video signal associated with the primary video device on the left image portion of the display screen. Additionally, following this, during a tenth step 920, the control unit displays the second video signal associated with the external video device on the right image portion.

FIG. 10 is a preferred embodiment of a process for controlling a video display system while a primary video device is turned off or disconnected. During a first step 1002, the control unit may determine if an external video device is connected. If, during first step 1002, the control unit determines that no external video device is connected, the control unit may proceed to second step 1004. During second step 1004, the control unit may wait for a user to turn on the primary video device or to connect and turn on an external video device.

If, during first step 1002, the control unit determines that an external video device is connected, the control unit may proceed to third step 1006. During third step 1006, the control unit preferably determines if two external video devices are connected at an input panel. If only a single external video device is connected, the control unit may proceed to fourth step 1008. During fourth step 1008, the control unit may operate the video display system in a single display mode. Furthermore, the control unit may display the video signal from the external video device on the display screen.

If, during third step 1006, the control unit determines that two external video devices are connected, the control unit may proceed to fifth step 1010. During fifth step 1010, the control unit preferably displays a first video signal that is received at the left external input port on the left image portion of the display screen. At the same time, during a sixth step 1012, the control unit preferably displays a second video signal that is received at the right external input port on the right image portion of the display screen.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A video display system for a motor vehicle, comprising:
a display screen configured to receive video information from one or more video devices, wherein the display screen alternates between a single display mode and a dual display mode based on detection of at least one video signal from one or more input ports, the dual display mode having a left image portion and a right image portion;
a primary video device is disposed within the motor vehicle, the primary video device including an internal input port in communication with the display screen;
an input panel comprising a plurality of external input ports in communication with the display screen, the plurality of external input ports including a left external input port in communication with the display screen and a right external input port in communication with the display screen;
the left external input port being physically located to the left of the right external input port;
a control unit in communication with the internal input port, the left external input port, the right external input port, and the display screen, the control unit being configured to receive the at least one video signal and determine whether the at least one video signal is from the internal input port, the left external input port or the right external input port;
wherein the control unit displays a primary video signal from the internal input port in at least one of the right image portion and the left image portion of the display screen in the dual display mode upon receiving at least one video signal from the left external input port or the right external input port;
wherein the control unit displays a first video signal from the left external input port in the left image portion of the display screen upon receiving the primary video signal and the first video signal; and
wherein the control unit displays a second video signal from the right external input port in the right image portion of the display screen upon receiving the primary video signal and the second video signal.

2. The video display system according to claim 1, wherein the first video signal received at the left external input port is displayed in the single display mode across both of the left portion and the right portion of the display screen upon the second video signal not being received from the right external input port and the primary video signal not being received from the internal input port.

3. The video display system according to claim 1, wherein the second video signal received at the right external input port is displayed in the single display mode across both of the left portion and the right portion of the display screen upon the first video signal not being received from the left external input port and the primary video signal not being received from the internal input port.

4. The video display system according to claim 1, wherein the left external input port and the right external input port share a set of common audio input ports.

5. The video display system according to claim 1, wherein the input panel having the left external input port and the right external input port are is disposed on a rear console.

6. The video display system according to claim 1, wherein the left external input port and the right external input port are configured to connect to an external video device.

7. A method of operating a display screen for a motor vehicle, comprising the steps of:
receiving a first video signal from a first video device, wherein the first video device is a primary video device, wherein the primary video device is disposed within the motor vehicle, the primary video device including an internal input port in communication with the display screen;
receiving a second video signal associated with a first external video device from an input panel comprising a right external input port and a left external input port;
determining whether the second video signal is received from the right external input port or the left external input port;
displaying the first video signal on a left image portion of the display screen and displaying the second video signal on a right image portion of the display screen upon determining that the second video signal is being received from the right external input port;
receiving a third video signal associated with a second external video device from the input panel;
determining whether the third video signal is received from the right external input port or the left external input port;
displaying the third video signal on the left portion of the display screen and displaying the second video signal on the right image portion of the display screen upon determining that the third video signal is being received from the left external input port.

8. The method according to claim 7, wherein the primary video device is a DVD player.

9. The method according to claim 7, wherein the primary video device is a navigation system.

10. The method according to claim 7, wherein at least one of the first external video device and the second external video device is a DVD player.

11. The method according to claim 7, wherein at least one of the first external video device and the second external video device is a video game system.

12. The method according to claim 7, wherein the first video signal is displayed in single display mode upon disconnecting the first external video device and the second external video device from the display screen.

13. A method of operating a display screen for a motor vehicle, comprising the steps of:
receiving a first video signal from a first video device, wherein the first video device is a primary video device, wherein the primary video device is disposed within the motor vehicle, the primary video device including an internal input port in communication with the display screen;
receiving a second video signal from a left external input port of an input panel comprising a right external input port and the left external input port, wherein the left external input port is connected to a second video device, wherein the second video device is a first external video device;
determining that the second video signal is received from the left external input port;
displaying the first video signal on a right image portion of the display screen and displaying the second video signal on a left image portion of the display screen;
operating the display screen in a single display mode and displaying only the first video signal upon disconnecting the second video device from the left external input port;
receiving a third video signal from the right external input port, wherein the right external input port is connected to a third video device, wherein the third video device is a second external video device;
determining that the third video signal is received from the right external input port; and
displaying the first video signal in the left image portion of the display screen and displaying the third video signal on the right image portion of the display screen.

14. The method according to claim 13, wherein the third video signal is displayed on the display screen in single display mode upon turning off the first video device.

15. The method according to claim 13, wherein the second video signal is displayed on the left image portion of the display screen, the third video signal is displayed on the right image portion of the display screen, and the first video signal is not displayed upon receiving the second video signal and the third video signal.

16. The method according to claim 15, wherein the first video signal is displayed on at least one of the left image portion and the right image portion of the display screen upon disconnecting at least one of the second video device and the third video device.

17. The method according to claim 16, wherein the first video signal is displayed on the display screen in single display mode upon disconnecting the second video device and the third video device.

18. The method according to claim 16, wherein the second video signal is displayed on the display screen in single display mode upon turning off the first video device while the second video device is connected and the third video device is disconnected.

19. The method according to claim 13, wherein the left external input port is disposed to the left of the right external input port on the input panel.

20. The method according to claim 13, wherein the left image portion is disposed to the left of the right image portion on the display screen.

21. A method of operating a display screen for a motor vehicle, comprising the steps of:
receiving a first video signal from a first video device, wherein the first video device is a primary video device, wherein the primary video device is disposed within the motor vehicle, the primary video device including an internal input port in communication with the display screen;
receiving a second video signal associated with a first external video device from an input panel comprising a right external input port and a left external input port;
determining whether the second video signal is received from the right external input port or the left external input port;
displaying the first video signal on a right image portion of the display screen and displaying the second video signal on a left image portion of the display screen upon determining that the second video signal is being received from the left external input port;
receiving a third video signal associated with a second external video device from the input panel;

determining whether the third video signal is received from the right external input port or the left external input port; and displaying the third video signal on the right portion of the display screen and displaying the second video signal on the left image portion of the display screen upon determining that the third video signal is being received from the right external input port.

22. A method of operating a display screen for a motor vehicle, comprising the steps of:

receiving a first video signal from a first video device, wherein the first video device is a primary video device, wherein the primary video device is disposed within the motor vehicle, the primary video device including an internal input port in communication with the display screen;

receiving a second video signal associated with an external video device from an input panel comprising a right external input port and a left external input port;

determining whether the second video signal is received from the right external input port or the left external input port;

wherein, upon determining that the second video signal is received from the left external input port, displaying the first video signal on a right image portion of the display screen and displaying the second video signal on a left image portion of the display screen; and wherein, upon determining that the second video signal is received from the right external input port, displaying the first video signal on the left image portion of the display screen and displaying the second video signal on the right image portion of the display screen.

23. A method of operating a display screen for a motor vehicle, comprising the steps of:

receiving a first video signal from a first video device, wherein the first video device is a primary video device, wherein the primary video device is disposed within the motor vehicle, the primary video device including an internal input port in communication with the display screen;

receiving a second video signal from a right external input port of an input panel comprising the right external input port and a left external input port, wherein the right external input port is connected to a second video device, wherein the second video device is a first external video device;

determining that the second video signal is received from the right external input port;

displaying the first video signal on a left image portion of the display screen and displaying the second video signal on a right image portion of the display screen;

operating the display screen in a single display mode and displaying only the first video signal upon disconnecting the second video device from the right external input port;

receiving a third video signal from the left external input port, wherein the left external input port is connected to a third video device, wherein the third video device is a second external video device;

determining that the third video signal is received from the left external input port; and displaying the first video signal on the right image portion of the display screen and displaying the third video signal on the left image portion of the display screen.

* * * * *